(12) United States Patent
Hood et al.

(10) Patent No.: US 7,181,900 B2
(45) Date of Patent: Feb. 27, 2007

(54) NETWRAP FEED AND CUT MECHANISM

(75) Inventors: William A. Hood, Reasnor, IA (US); Thomas R. Walmsley, Pella, IA (US)

(73) Assignee: Vermeer Manufacturing Co., Pella, IA (US)

( * ) Notice: Subject to any disclaimer, the term of this patent is extended or adjusted under 35 U.S.C. 154(b) by 5 days.

(21) Appl. No.: 10/719,460

(22) Filed: Nov. 21, 2003

(65) Prior Publication Data

US 2005/0109007 A1  May 26, 2005

(51) Int. Cl.
*A01D 39/00* (2006.01)
(52) U.S. Cl. .............................. 56/343; 56/341; 100/88
(58) Field of Classification Search ................. 56/341, 56/343; 100/88, 89
See application file for complete search history.

(56) References Cited

U.S. PATENT DOCUMENTS

| | | | |
|---|---|---|---|
| 3,666,665 A | 5/1972 | Chapman | |
| 4,244,167 A * | 1/1981 | Seefeld et al. ................. | 56/341 |
| 4,366,665 A | 1/1983 | VanGinhoven et al. | |
| 4,599,844 A | 7/1986 | Clostermeyer | |
| 4,604,855 A | 8/1986 | Krone | |
| 4,697,402 A | 10/1987 | Anstey | |
| 4,729,213 A | 3/1988 | Raes | |
| 4,910,949 A * | 3/1990 | Meyer .......................... | 56/341 |
| 4,917,008 A | 4/1990 | van den Wildenberg | |
| 5,036,642 A | 8/1991 | Underhill | |
| 5,129,208 A | 7/1992 | Van Zee | |
| 5,855,109 A | 1/1999 | Vande Ryse et al. | |
| 6,006,504 A | 12/1999 | Myers | |
| 6,098,390 A * | 8/2000 | Anstey ......................... | 56/341 |
| 6,164,050 A | 12/2000 | Vande Ryse et al. | |
| 6,477,824 B2 * | 11/2002 | Preheim ....................... | 56/341 |
| 6,550,218 B2 | 4/2003 | McClure | |
| 6,598,369 B2 * | 7/2003 | Anstey et al. ................. | 53/118 |
| 6,622,454 B2 * | 9/2003 | Anstey .......................... | 53/118 |
| 2003/0005663 A1 * | 1/2003 | Anstey et al. ................. | 53/118 |

FOREIGN PATENT DOCUMENTS

EP   0820691   1/1998

\* cited by examiner

*Primary Examiner*—Thomas B. Will
*Assistant Examiner*—Alicia Torres
(74) *Attorney, Agent, or Firm*—Sturm & Fix LLP (57) ABSTRACT

A baler having an inlet area for receiving netwrap wherein it is a short distance between the drum roller and the closest belt roller. The netwrap guide at bottom of baler includes a feed pan having flexible net guides that are narrower than the bale forming belts. This netwrap guide has supporting cross members underneath it but there are no cross members in close vicinity to the lower belt roller to keep excess crop from accumulating there. There is also a netwrap guide at front of the baler for feeding netwrap material into contact with the periphery of a formed bale, including a guide positioned generally above the pickup for directing crop material previously inserted into the bale formation chamber and the netwrap material away from the pickup. The baler also has a novel netwrap feeding and cutting mechanism.

16 Claims, 9 Drawing Sheets

NETWRAP FEED AND CUT MECHANISM

TECHNICAL FIELD

The principles disclosed relate to improvements to round balers used for harvest of agricultural crops. More particularly, the invention relates to improved reliability of the mechanism that feeds netwrap and controls tension of the netwrap to a formed cylindrical bale for wrapping the bale, as necessary to achieve a high level of reliability. The invention further relates to a feed mechanism that is configured to minimize potential negative influences related to crop material buildup and to minimize the potential for the netwrap material to be affected by the balers's pickup assembly. It further relates to the mechanism that severs the netwrap at the conclusion of the wrap cycle.

BACKGROUND

Many mechanisms have been developed for wrapping bales with netwrap, which is a sheet material typically in the form of light, very thin web material. Examples that utilize feed rollers are disclosed in R. M. Van Ginhoven et al U.S. Pat. No. 4,366,665; C. Clostermeyer et al U.S. Pat. No. 4,599,844; Krone et al U.S. Pat. No. 4,604855; H. D. Antsey et al U.S. Pat. No. 4,697,402; J. L. Raes U.S. Pat. No. 4,729,213; DE 92 11 541; and J. H. Merritt U.S. Pat. No. 4,729,213 and commonly assigned Van Zee U.S. Pat. No. 5,129,208. The use of feed rollers to feed this light, unstable material has inherent limitations. A mechanism that does not utilize feed rollers is disclosed in Underhill U.S. Pat. No. 5,036,642. It is particularly adapted for feeding the netwrap into the front of a round baler. Another mechanism that does not utilize feed rollers, and is adapted for feeding netting into the rear portion of a baler is disclosed in Van den Wildenberg EP 0 820 691.

The supply roll of the netting material is known to be wider than the length of the cylindrical bale. Mechanisms have been developed to improve the feeding of this wide netwrap material. One early example is shown in Van den Wildenberg U.S. Pat. No. 4,917,008. Later mechanisms, to more reliably wrap the netwrap material around the edges of the bale, are disclosed in McClure et al. U.S. Pat. No. 6,550,218 and Myers et al. U.S. Pat. No. 6,006,504. The mechanism disclosed in Myers includes an element that interacts with the formed bale and cooperates with the lower idler roller that defines the net entry point, to provide space for entry of the outer edge of the netting material into the baler such that the outer edge does not contact the bale until some distance from the idler roller. The use of such an element, located near a roller at the bottom of a baler, was previously known, as disclosed in Meyer U.S. Pat. No. 4,910,949 as a wedge member that interacts with the formed bale to affect the sides of the bale.

In addition to feeding the material to the baler, the netwrap mechanism must sever the material, after the desired amount of netwarp has been dispensed. The Van den Wildenberg reference discloses a cutting mechanism comprising several moving parts that must work together to cut the netwrap.

SUMMARY

The present invention provides a reliable cost effective mechanism for feeding netwrap material from a supply roll, wider than the length of the cylindrical bale forming chamber, without the use of feed rollers, in combination with a simplified mechanism for cutting the netwrap.

DETAILED DESCRIPTION

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed. Any references, herein, to directions will be determined by facing in the direction of travel of the baler during normal operation.

Figure 1:
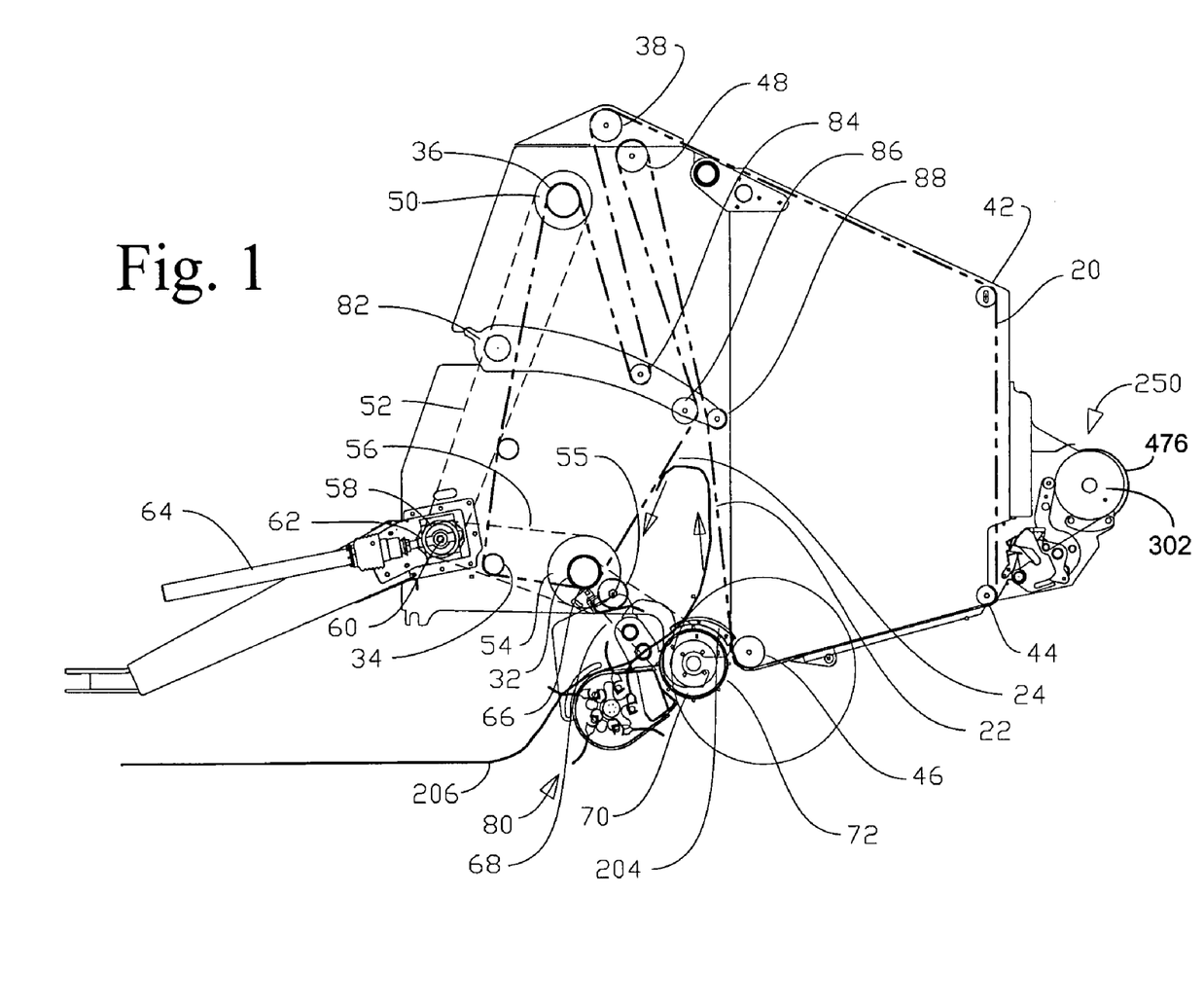
FIG. 1 is a schematic side view of an empty round baler.

FIG. 1 illustrates a schematic side view of a round baler, illustrating the main functional components. A number of bale forming belts 20, of a known flat configuration typically approximately ¼ to ½ inch in thickness and four to fourteen inches in width, are routed over several belt rollers that are in fixed positions including rollers 32, 34, 36, 38, 42, 44, 46 and 48. These fixed belt rollers are supported by bearings, in any known method, that are mounted to a left side panel and a right side panel; the panels are not shown as many configurations of the panels are well known. The length of the rollers affects the spacing between the side panels and the length of the bale forming chamber and subsequent bale that that will be formed.

At least one of these rollers is rotated, typically by a chain drive. There are many known configurations for the drive system. The drive configuration illustrated in FIG. 1 includes a drive system that powers the bale forming belts 20 including two drive rollers: roller 36, driven by sprocket 50 and roller 32, driven by sprocket 54. Sprockets 50 and 54 are driven by chain 52 and chain 56 which are both coupled to sprocket 58; mounted to, and driven by, shaft 60. Shaft 60 is connected to the output shaft of right-angle gearbox 62. The input shaft of right-angle gearbox 62 is connected to driveline 64, that transfers power from a towing vehicle, not shown.

The drive configuration further includes a drive to lower bale forming roller 72 including sprocket 66, mounted to shaft of roller 32, which is coupled to sprocket 70 by chain 68. Sprocket 70 is mounted to and drives roller 72.

The drive system further includes additional chain drives, not shown, to power the pickup assembly 80 and a starter roller 55.

Pickup 80 functions to lift crop material 206 from the ground and into engagement with roller 72. Roller 72 transfers the crop rearward, into engagement with the belts 20. A rear, vertical section 22 of belts 20 is powered to move in an upward direction resulting from the powered rotation of rollers 36 and 32. As the crop contacts this rear section 22 it will be lifted. Gravity and the downward movement of a front, vertical section 24 of belts 20 will tend to encourage the crop to fall back towards starter roller 55 which is turning in a clockwise direction. The material is thus directed back towards roller 72 which again feeds it rearward. The outside edges of the cylindrical bale will contact the side panels and wedge 204, as the bale forms. In this manner the powered elements cooperate to roll the windrow of crop into a cylindrical bale.

Figure 2:
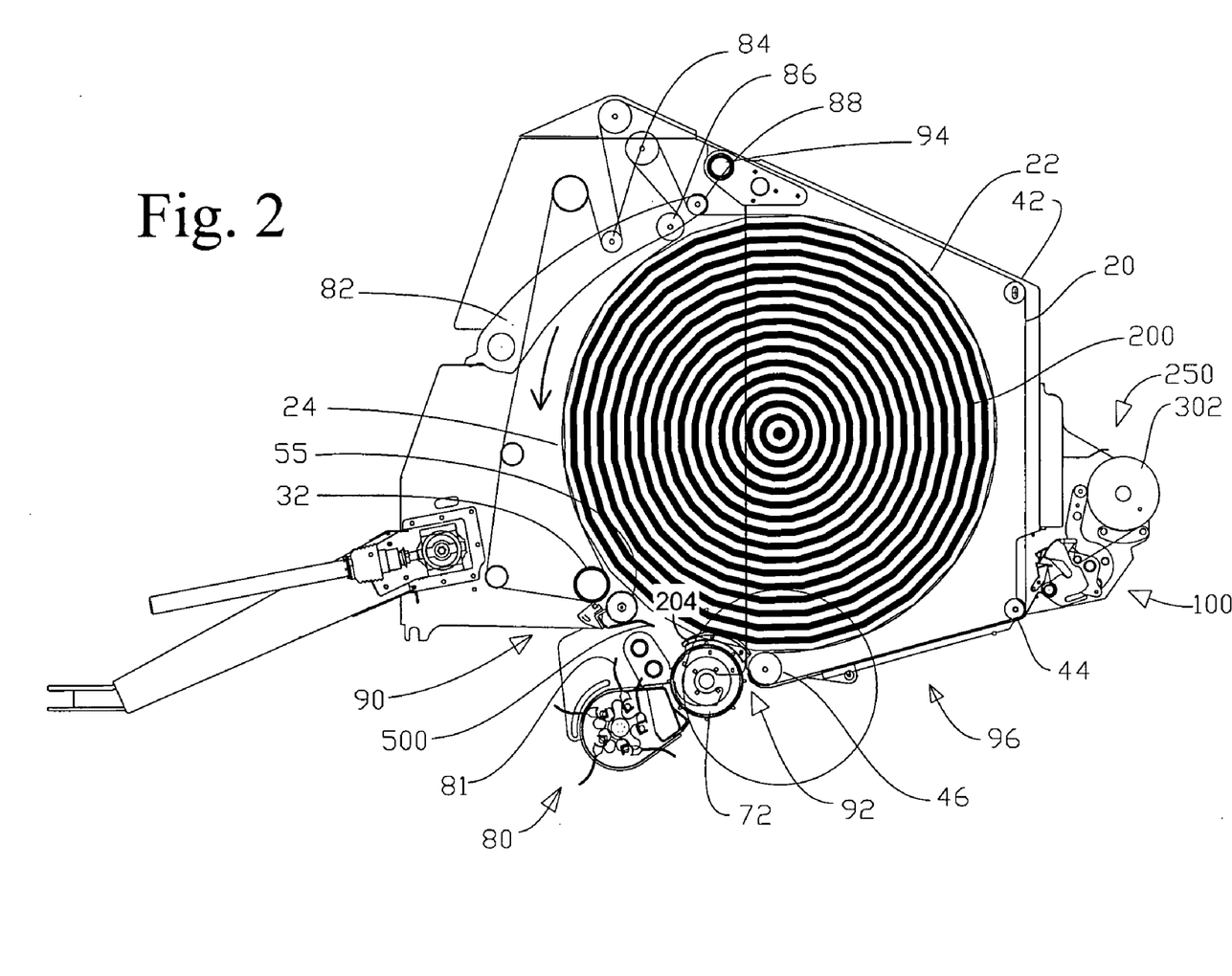
FIG. 2 is a schematic side view of a round baler with a full-sized bale therein.

As the bale begins to expand, the rearward section 22 and forward section 24 of belts 20 begin to envelop the bale. The belts 20 are able to envelop the circumference of and stay in contact with the bale as the belt tightener 82 and belt tightener rollers 84, 86 and 88 rotate counterclockwise as illustrated in FIG. 2, with a nearly formed bale 200. Many mechanisms are known to be useful in controlling the movement and position of the belt tightener rollers.

Once a bale has reached its desired size, a wrapping material is applied to the outer circumference while it is still in the baler. After the bale is thus wrapped, the tailgate, which comprises a portion of the side panels and rollers 42, 44, and 46, will pivot around tailgate pivot 94, allowing the finished bale to drop out of the baler.

The known wrapping materials include either rope-like twine made from either natural fibers or various types of plastic, or sheet-type netwrap typically made of a type of plastic material. In some of the claims "protective material" is a generic term used to describe material such as netwrap, but which could include many other things such as a sheet of plastic or fabric, for example. These other materials are fully equivalent to netwrap so it is to be understood that "netwrap" and "protective material" can be used interchangeably in the context of this invention. Twine is typically inserted into a crop inlet area 90 of the baler by a mechanism not shown, and applied in a spiral fashion by moving a twine arm, not shown, from one side panel across to the opposite side panel while the bale is rotating.

Sheet-type netwrap is known to be applied to the bale by inserting it into the baler at any available area, one known entry point being the rear of the baler, in a secondary inlet area 92, located between roller 72 and roller 46, as illustrated in FIG. 2, by netwrap mechanism 250 of the present invention. Netwrap is typically supplied in a roll 302 that is typically wider than the bale chamber. The netwrap material tends to neck-down between the supply roll and the inlet area 92, yet remains wide enough to sufficiently cover the bale once the material is wrapped around the bale one time. However, since the netwrap is only secured to the bale by the interlacing of its strands with the discontinuous surface of the crop material, it is typically desirable to apply at minimum one and three-fourths to two wraps of the netwrap material. Several functions are critical to assure successful wrapping including:

1) feeding of the netwrap material in a manner to control of the width of the netwrap material, in order to minimize the amount that it necks-down, to maximize coverage;

2) feeding of the netwrap material in a manner to allow control of the length delivered to the bale including a mechanism that will reliably sever the netting material after the proper amount has been applied to the bale, and also hold the cut edge in a position as necessary to direct the leading edge for the next bale;

3) feeding of the netwrap material in a manner to allow control of a leading edge of the netting material from the supply roll to the bale, the associated mechanism having a self-cleaning ability in order to minimize the amount of stray crop material that can build-up in any areas where the netting may travel, to avoid the damage that this stray crop material can cause to the netting material;

4) application of adequate tension as the netting material is applied to the bale; and 5) control of the leading edge of the netwrap as it travels around bale for the initial time, to minimize the potential for entanglement with elements of the baler, in particular the pickup.

Figure 3:
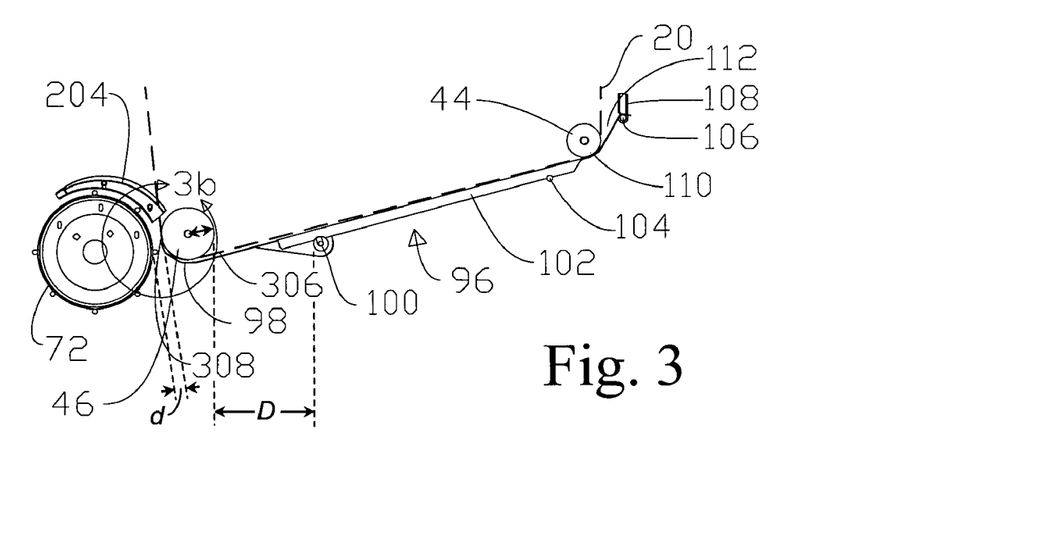
FIG. 3 is a partial schematic side view of the secondary inlet illustrating the configuration of the netwrap guides.
Figure 3A:
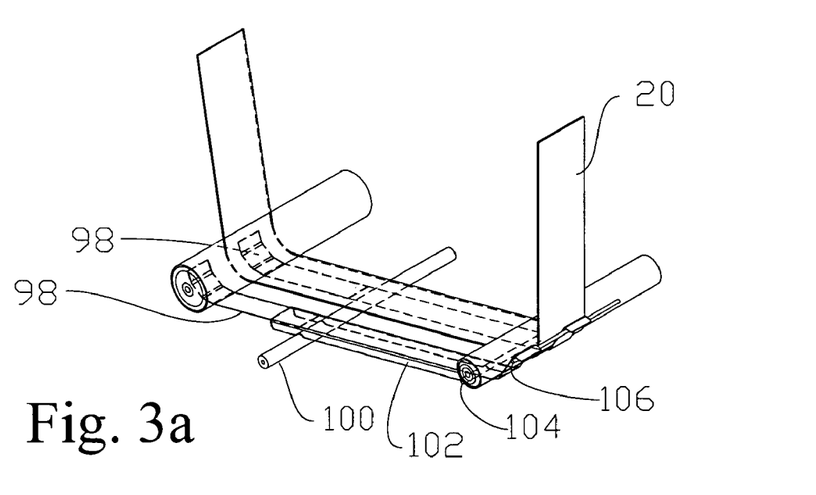
FIG. 3a is a partial isometric view of the net feed pan.

The process of wrapping a bale with netwrap mechanism of the present invention starts when the power feed system, which will be described later, directs a leading edge of netwrap from a held position near the supply roll 302, to the feed pan 96 which is illustrated in FIGS. 3 and 3*a*.

Feed pan 96 includes a netwrap guide 98 located near to roller 46, preferably one guide 98 for each baler belt 20. Note: FIG. 3*a* only shows one baler belt and only two netwrap guides, for clarity. There may be fewer guides 98 than there are baler belts. The feed pan 96 will include the proper number of components as required by the specific baler: a baler constructed to form a 4' wide bale, for instance, will usually include a different number of belts than a baler constructed to form a 5' wide bale, and the net feed pan for a 5' wide baler will thus usually include a different number of netwrap guides than a net feed pan for a 4' wide baler. Each netwrap guide 98 is narrower than the baler belts, and mounted below the belt 20, supported by a frame 102 which is also narrower than the belt 20 and fixedly connected to cross-members including pivot shaft 100, reinforcing rod 104 and reinforcing rod 106. In this manner the netwrap guides 98 are mounted in a cantilevered fashion so that there are no cross-members 100, 104 or 106 in close proximity to roller 46.

Referring again to FIG. 3, the pivot shaft 100 of the illustrated embodiment, the cross-member that is closest to roller 46, is located a distance "D" in a range of 2 to 30 inches and is preferably 10 to 12 inches behind, and horizontally offset from, roller 46. The horizontal offset is important because the movement of the belts 20, combined with gravity, results in forcing the majority of the stray crop material towards roller 46. Thus, any cross-member in close proximity, and particularly within close proximity along the horizontal axis, to roller 46 may restrict the stray material. Any restriction may result in eventual build-up to the point that it can interfere with the travel of the netwrap, either disrupting the movement of the leading edge, or damaging the netwrap material as it is applied to the bale. For example the support bar 96, and the structure 90 above it, in FIG. 8 of U.S. patent application Publication U.S. 2003/0005663 provides a place for the crop to drop down from the baling chamber and accumulate on, creating a problem. From this illustration it will be appreciated that it is important to keep structural members out of that area to eliminate that problem.

The flexible net guides 98 are in a spaced relation to the lower roller 46 such that the flexible net guides 98 are supported by a cross-member 100 spaced a minimum horizontal distance from the lower roller 46 equal to the diameter of the lower roller 46.

Also in FIG. 3 is a dimension "d" which is the distance between the drum roller 72 and the belt roller 46. The distance "d" between the drum roller 72 and belt roller 46 is less than the radius of the belt roller 46, thereby forming a inlet for a leading edge of the protective material capable of reliably feeding the protective material to a place in the baling chamber where it can be wrapped around the bale. If this distance "d" is greater than the radius of the roller 46, some of the crop being transferred by the drum roller 72 to the baling chamber will travel down to the ground between the drum roller 72 and the closest belt roller 46 and be lost instead of being part of the bale 200.

In addition, the netwrap guides are constructed of spring steel, or any material capable of allowing frequent deflections, in order to move and thus to further minimize restriction to stray crop material that falls out of the baler, between belts 20. Any material that does fall between the belts is thus able to fall to the ground.

Spring 108 attaches to reinforcing rod 106 to rotate the net feed pan 96 around the pivot shaft 100, rotationally attached to the sides of the baler, until a top edge 110 contacts the baler belt 20 at roller 44.

The upper portion of the net feed pan 96 extends beyond the top edge 110 creating a type of funnel 112 that feeds the netwrap material into the pinch point created where the top edge 110 contacts the baler belts 20. As the leading edge of the netwrap material is fed by the power feed system to funnel 112, it will be placed into contact with the baler belts 20 at the contact point 110, subsequently following along with the moving baler belts along the length of the net feed pan 96.

One aspect of the present invention affects the quality of coverage of the netwrap onto the bale. The quality of coverage is affected by the configuration of the inlet area 92 defined by relationship of roller 46, roller 72, wedge 204, guides 98, and the forming bale 200.

Figure 3B:
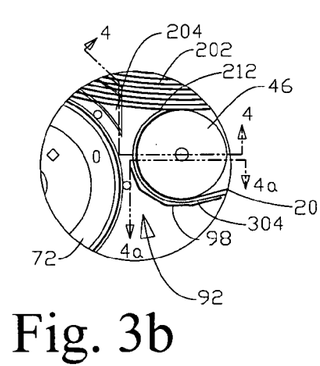
FIG. 3b is an enlarged view of area 3b as identified in FIG. 3.
Figure 4:
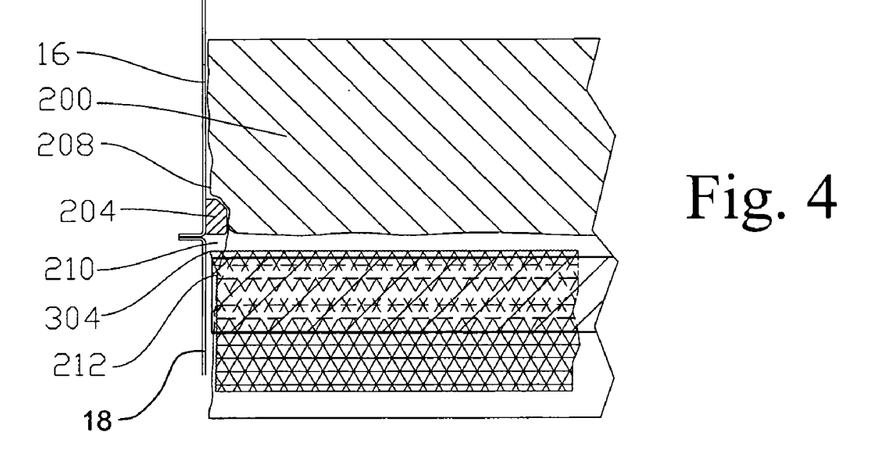
FIG. 4 is a cross sectional view as would be viewed taken along viewing plane 4—4 shown in FIG. 3b.

Inlet area 92 is illustrated in FIG. 3b as defined at the front by roller 72, at the top by the bottom portion 202 of bale 200 and at the rear by roller 46, which is indirectly in contact with bale 200 as belts 20 are positioned between the roller 46 and bale 200. The sides 208 of the cylindrical bale 200 are in contact with the front side panels 16, and with a bale wedge 204 on each end. Bale wedge 204, as described in U.S. Pat. No. 4,910,949 which is incorporated herein by reference, functions to deflect the sides 208 of the bale 200 inward and upward, near the bottom perimeter 202, as illustrated in FIG. 4. It has been found that this slight deflection is sufficient to provide space 210 required to allow the netwrap material 304 to engage the bale 200 at a place 212 across the bale, within the secondary inlet 92, as it is guided around roller 46 by netwrap guides 98.

Figure 4A:
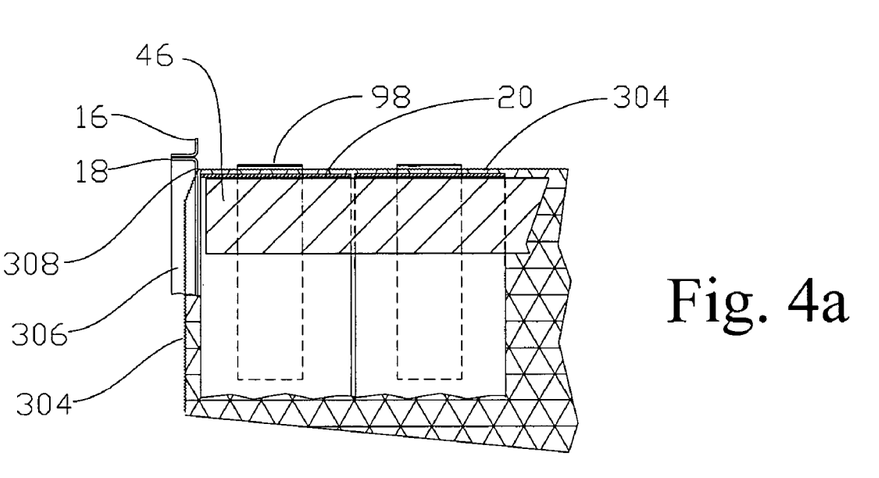
FIG. 4a is a cross sectional view as would be viewed along viewing plane 4a—4a shown in FIG. 3b.

FIG. 4a illustrates a partial cross sectional view along line 4a—4a of FIG. 3b looking down towards the net guides 98, showing the netting material 304 traveling through the net feed pan 96 from approximately point 306 to point 308, identified in FIG. 4a, at a width that is greater than the width between the tailgate side panels 18. As the net material 304 follows the belts 20 around roller 46, as guided by guides 98, it is forced to be narrower to properly engage the bale 200, in the same area as the previously identified space 210 where the bale 200 is slightly defleclected away from the side panel 16 by wedge 204.

Figures 3C, 3D:
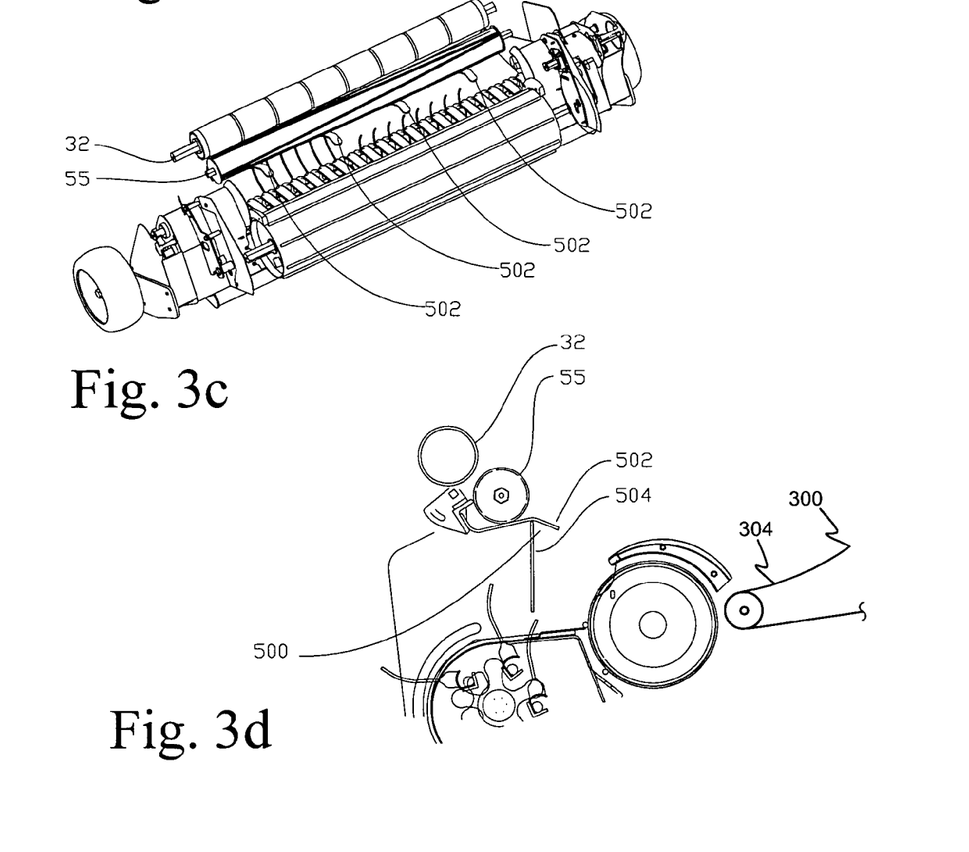
FIG. 3c is an isometric view showing the front net guide.
FIG. 3d is an enlarged side view like FIG. 1 but showing the pickup, lower forming roller and one of the belt rollers.
Figure 3E:
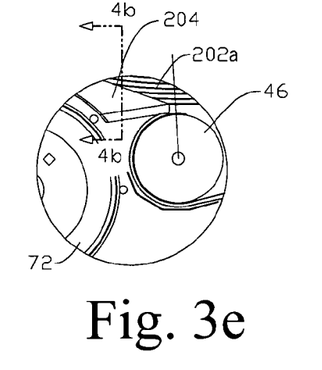
FIG. 3e is a view like FIG. 3d, but showing an alternate form of the wedge member.
Figure 4B:
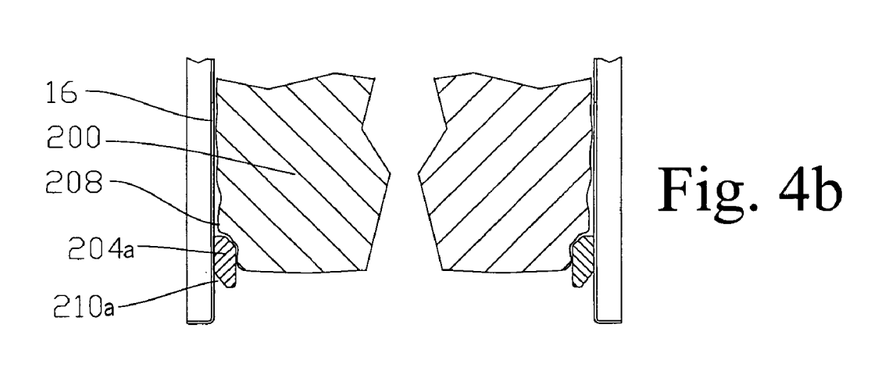
FIG. 4b is a cross sectional view as would be viewed along viewing plane 4b—4b shown in FIG. 3e.

FIG. 4b illustrates a partial cross sectional view along line 4b—4b of FIG. 3e looking down towards the net guides 98, showing the netting material 304 traveling through the net feed pan 96 from approximately point 306 to point 308, identified in FIG. 4a, at a width that is greater than the width between the tailgate side panels 18. As the net material 304 follows the belts 20 around roller 46, as guided by guides 98, it is forced to be narrower to properly engage the bale 200, in the same area as the previously identified space 210 where the bale 200 is slightly deflected away from the side panel 16 by wedge 204a, which is slightly different than the wedge 204 shown in FIGS. 3b and 4a. Accordingly the void 210a formed is a slightly different shape and at a slightly different place than the void 210.

When the leading edge reaches the inlet 92, an initial length of netwrap material 304 will have been dispensed, sufficient to partially wrap a bale 200. The process continues by guiding the leading edge of netwrap material 304 though the inlet 92 so that it contacts the formed bale, whereby the rotation of the bale 200 will trap the netwrap material 304 between the outer perimeter of the bale and the belts 20. As the bale 200 continues to rotate, the netwrap material 304 will be aggressively pulled from the supply roll 302. At that time the power feed system can be disengaged, and it is desirable to apply a significant drag so that the netwrap will be under tension as it is applied to the bale.

Referring to FIGS. 1 and 2 as the leading edge of netwrap material 304 travels around the bale, with the belts 20, it will eventually reach the bottom of the front vertical section 24 of belts 20, in the vicinity of belt roller 32 and starter roller 55. At this point the leading edge of netwrap material 304 can become unstable, and there is a possibility for it to come into contact with the pickup teeth 81 of pickup 80. When this happens the netting can become partially entangled in the pickup 80, which will damage the wrap material. To reduce the frequency of this entanglement, a guide 500 shown in FIG. 2 is disposed below the start roller 55 to direct the leading edge back towards the drum roller 72, and away from contact with the pickup 80.

FIG. 3c is an isometric view from inside the baler looking towards the guide 500, and illustrates a first embodiment of the guide, including a plurality of rigid bars 502 that extend in a generally horizontal direction to a position where they will contact the leading edge as it travels through this position. FIG. 3d shows an alternative embodiment having a vertical element 504, that may be a flexible sheet-type material, such as belt-type material, that extends to the pickup 80 to block the path of the leading edge of netwrap material 304.

After the desired amount of netwrap material 304 has been dispensed, the netwrap is severed by the netwrap feed mechanism 250 (FIG. 2) of the present invention, as will be described later, near the supply roll 302. The netwrap material 304 that is stretched between the inlet point 92 and the severing mechanism, incluidng knife 400, is pulled into the baler, finishing the wrap cycle.

Figure 5:
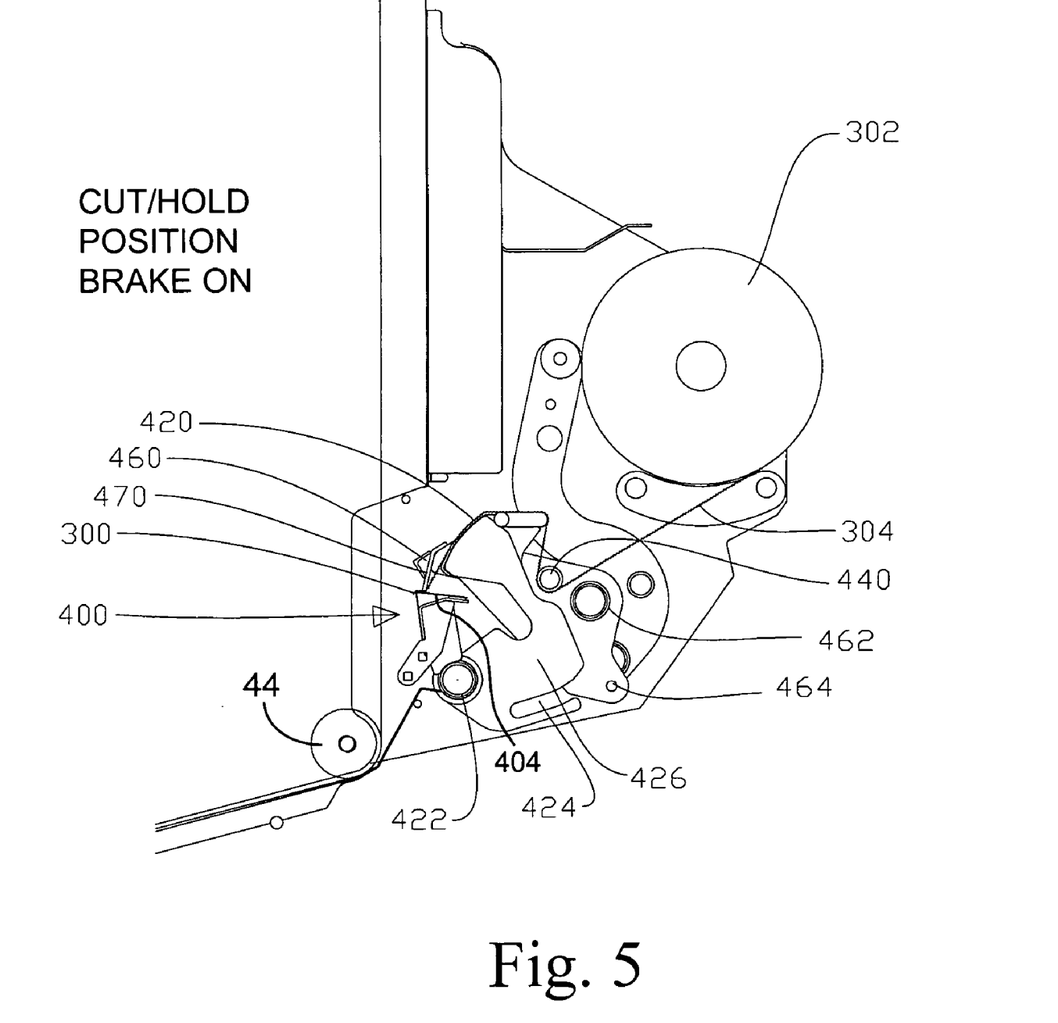
FIG. 5 is a partial schematic section of the baler illustrating the netwrap mechanism in the cut/hold position.
Figure 6:
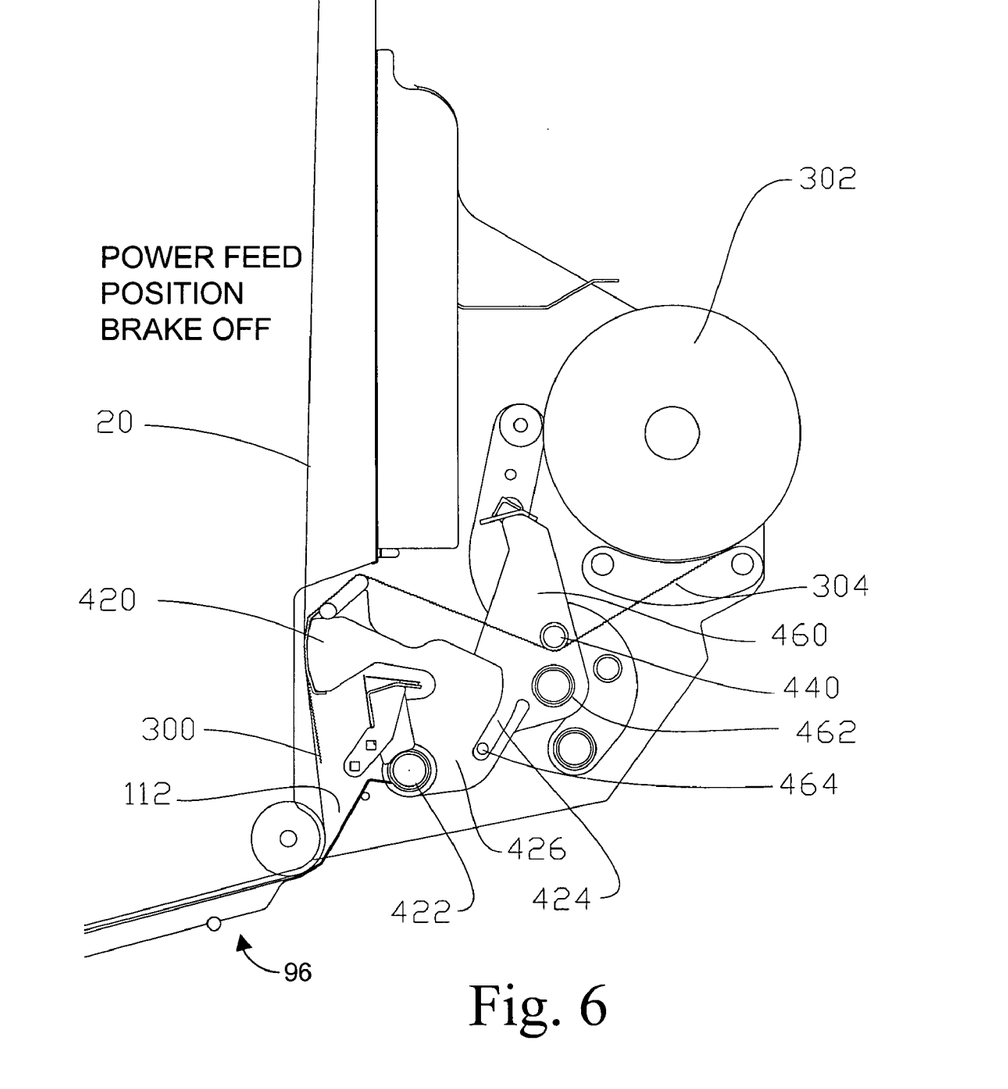
FIG. 6 is a partial schematic section of the baler illustrating the netwrap mechanism in the power feed position.
Figure 7:
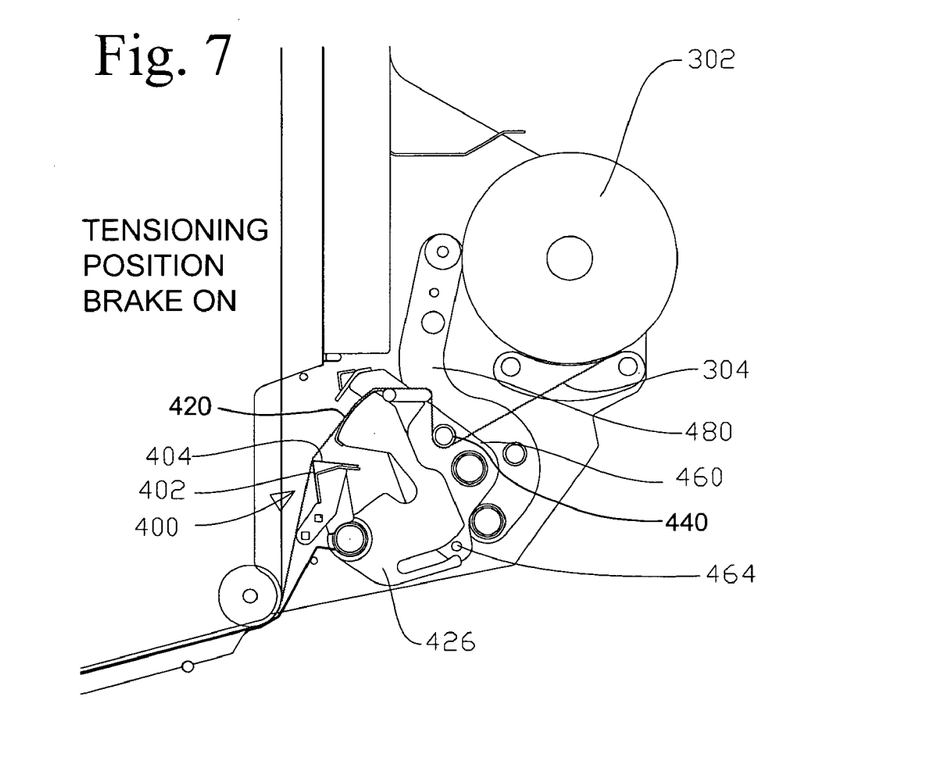
FIG. 7 is a partial schematic section of the baler illustrating the netwrap mechanism in the tensioning position.

The power feed, tension and cut functions, of the netwrap wrapping process, are provided by the netwrap mechanism 250. FIGS. 5–7 illustrate the netwrap mechanism 250 in 3 basic positions of a netwrap cycle: FIG. 5 is the cut/hold position, FIG. 6 is the powered feed position, and FIG. 7 is the tensioning position. The operation of the netwrap mechanism 250 typically begins with the leading edge 300 of the netwrap material 304 held in position in preparation to begin feeding, as will be required to wrap the next finished bale, as illustrated in FIG. 5.

In this cut/hold configuration of FIG. 5, a length of netwrap material 304, extending from a roll 302 of netwrap material 304 to the leading edge 300, is routed around a net spreader roll 440 and over net pan 420 where it is held against a stationary knife 400 by cross member 470 of driver 460. The netwrap mechanism 250 will be in this position during most of the baling process.

Figure 8:
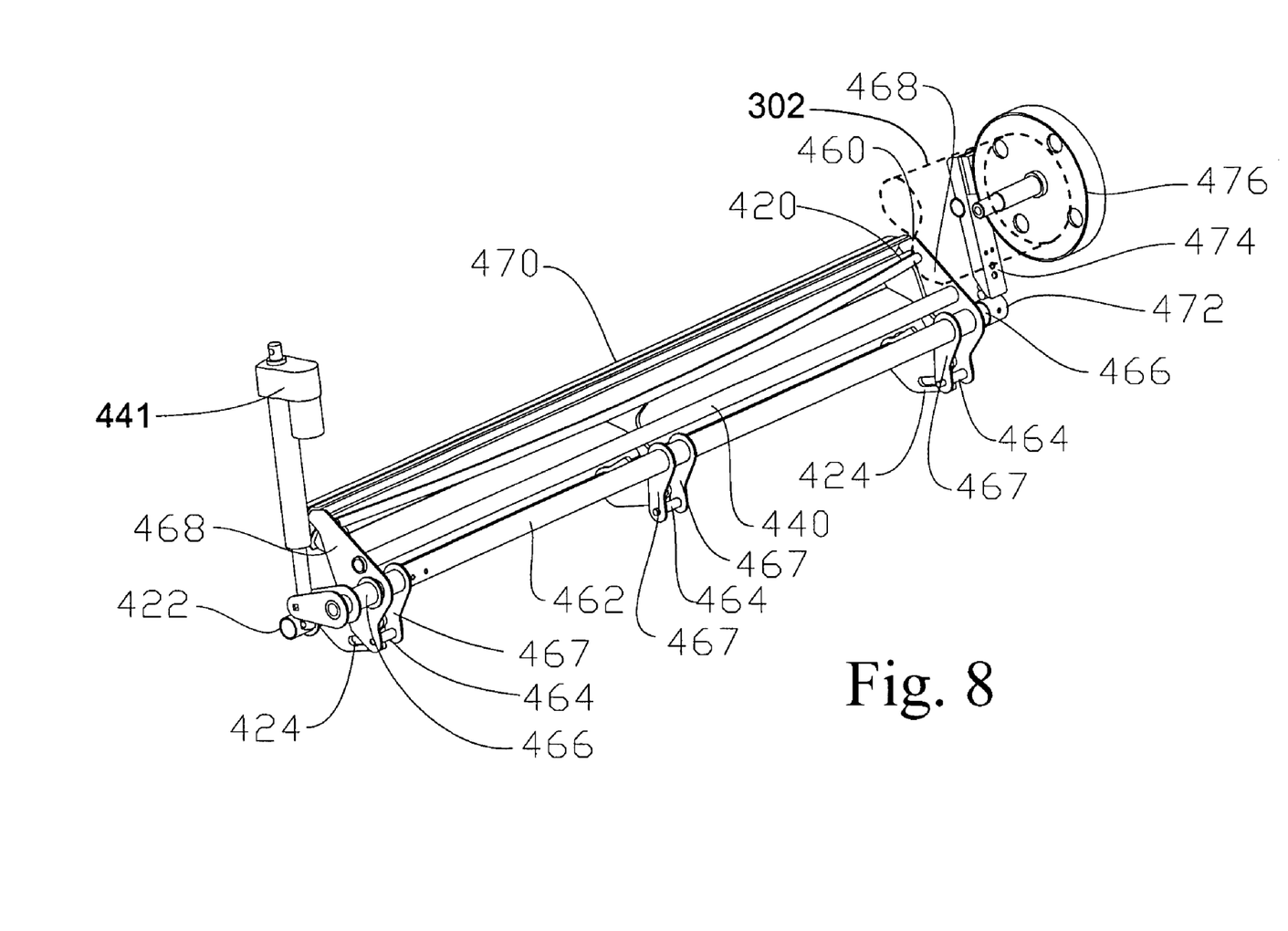
FIG. 8 is an isometric view showing the driver and its actuator.
Figure 9:
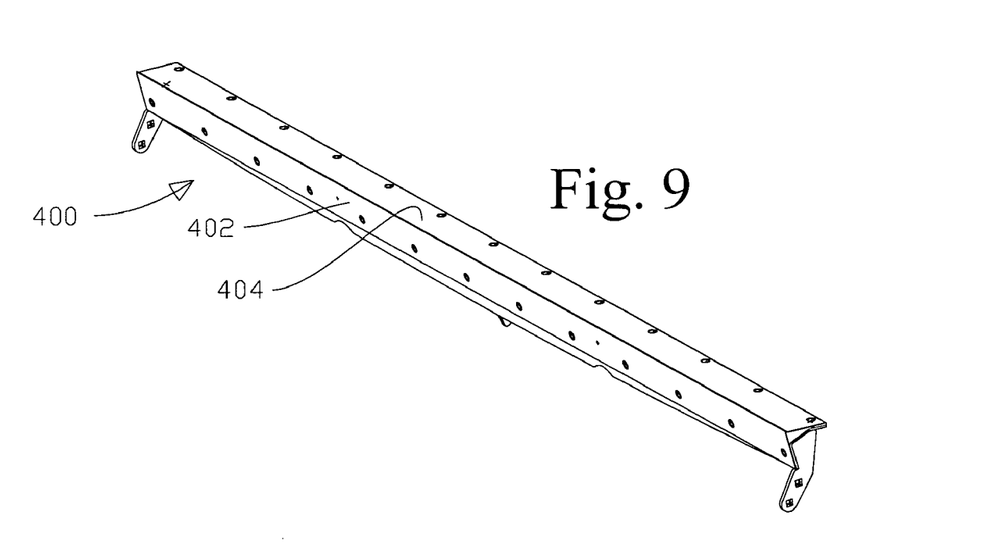
FIG. 9 is an isometric view showing the net knife.

Once the bale 200 is formed to the desired size, the bale wrap cycle will be initiated when the driver 460 is pivoted clockwise around its pivot tube 462. As driver 460 rotates from the position shown in FIG. 5 to the position shown in FIG. 6, drive rollers 464 engage slot 424 of net pan 420, causing net pan 420 to rotate around pivot tube 422 to the powered feed position shown in FIG. 6. This movement could be controlled by any of a number of mechanical drive elements. The preferred embodiment of the drive mechanism is illustrated in FIG. 8 as a linear electrical actuator 441 that is anchored to the side panel 18 of the net wrap attachment 250. Driver 460 is mounted on bushings, not shown, in areas 466 that mount to the side panels 18 of the netwrap mechanism 250. It further includes side plates 468 that support cross members 470 and spreader roller 440. Side plates 468 support drive rollers 464 that are further supported by arms 467.

Driver 460 is rotated clockwise about pivot tube 462 as the actuator 441 on one end is retracted, the opposite end of the pivot tube 472 is used to activate linkage 474 that controls a force applied to a brake rotor 476. Brake rotor 476 is connected to the roll of netwrap 302. In this manner, as the driver is rotated fully clockwise, actuator is fully retracted, to the powered feed position shown in FIG. 6, the drive rollers 464 have engaged slots 424 of side plates 426 of net pan 420 pushing it into engagement with the baler belts 20. Net spreader roller 440 has been moved to release any residual tension in the netting material 304 and the brake force is released on the net supply roll 302. Thus, as the net pan 420 contacts the moving belts 20, the leading edge 300 of the netting material 304 is fed to the funnel 112 of net pan 96 as the netting material is pulled from the net supply roll 302 under minimal tension.

Once the leading edge 300 is fed through the inlet area 92 as shown in FIGS. 2 and 3b, and the netting material 304 is trapped between the baler belts 20 and the formed bale 200, it will be aggressively pulled from the supply roll 302, and the netwrap mechanism 250 will no longer need to power feed as shown in FIG. 6 and can move to the FIG. 7 tensioning position. Proper sequence of the netwrap mechanism 250 needs to insure that the leading edge 300 has been inserted into the inlet area 92, during the power feed portion of the cycle. Many techniques could be used to control this sequencing. One technique is to simply use a timing technique. The distance between the stationary knife 400 and the inlet area 92 determines the amount of netting that needs to be fed off of the supply roll 302 during the power feed portion of the cycle, in order to insure that the leading edge 300 will be at the inlet area.

Since the baler belts 20 travel with a known range of speeds, as is necessary for proper operation of the baler, it is possible to determine the minimum time required for power feed, and the control system will hold the netwrap mechanism 250 in the power feed position for at least that amount of time. Another technique is to approximately monitor the amount of netting that is dispensed, for instance by moitoring the rotation of the brake rotor that is fixed to the netting supply roll. When the required amount of netting has been dispensed, to insure that the leading edge is trapped between that bale and belts, the netting supply roll will have rotated through a known angle of rotation.

The netwrap mechanism 250 will move to the tensioning position shown in FIG. 7, after the required duration in the power feed position of FIG. 6, as the actuator 441 is partially extended, moving driver 460 counter-clockwise, causing movement of drive roller 464 and related movement of plate 426 such that net pan 420 moves away from engagement with the belts 20, to the position shown in FIG. 7. Net pan 420 is held in this position, because it is spring loaded or biased to rotate clockwise as viewed in FIG. 7.

Brake mechanism 474, shown in FIG. 8, is simultaneously activated such that the brake 476 is applied to the net roll 302 when the mechanism is in the position shown in FIG. 7. The brake mechanism 474 is also activated by a linkage, not shown, connected to arm 480, in a well known manner such that the brake force is affected by the size of the net supply roll; as the net material is pulled off the supply roll 302, and it gets smaller, the amount of brake force is reduced such that the net tension is held approximately constant.

The mechanism 250 will be held in this FIG. 7 tensioning position, with the brake applied, restricting rotation of net supply roll 302 to put the netting material 304 under tension, while an appropriate amount of netting material 304 is dispensed. After the appropriate duration, the actuator 441 will extend further, to reposition the mechanism 250 into the cut/hold position illustrated in FIG. 5 wherein the cross member 470 of driver 460 deflects the path of the netting material 304 such that it travels through approximately a 90 degree angle over net knife 402, which will cause the netting material 304 to be severed. At the same time, cross member 470 will trap the leading edge 300, for the next wrap cycle, against a spring member 404 where it will be securely held.

With regard to the forgoing description, it is to be understood that changes may be made in detail, especially in matters of the construction materials employed and the size, shape and arrangement of the parts without departing from the scope of the present invention. As used herein, the term "netwrap" is intended to include all sheet-type wrapping materials including tackified plastic materials and untackified plastic materials. It is intended that these specific and depicted aspects be considered exemplary only, with a true scope and spirit of the invention be indicated by the broad meaning of the following claims.

The invention claimed is:

1. A round baler comprising:
a frame;
sidewalls attached to the frame;
a drum roller operatively rotatably attached to the frame;
a pick-up mechanism operatively attached to the frame to deliver a crop from the ground to a baling chamber disposed between the sidewalls, and above the drum roller;
a plurality of belt rollers rotatably disposed between the sidewalls;
one of the belt rollers being disposed behind the drum roller, said one belt roller being the belt roller closest to the drum roller, said one belt roller having a radius;
a plurality of belts disposed at least partially between the sidewalls and each of the belts being trained over the belt rollers;
a roll of protective material desired to be disposed around the bale after it has been formed, the roll being operatively rotatably attached to the frame, the protective material on the roll being wider than the distance between the sidewalls;

a pair of arcuate wedges, one of the arcuate wedges being operatively attached respectively to the sidewalls above each respective end of the drum roller for compressing the lower edges of a bale being formed to form a void to receive edges of the protective material;

wherein the distance between the drum roller and said one belt roller is less than the radius of said one belt roller;

an inlet for a leading edge of the protective material, formed by a space between the drum roller and the one belt roller, to allow the protective material to be reliably fed to a place in the baling chamber where it can be wrapped around the bale; and a protective material guide member operatively attached to the frame for guiding the protective material from the roll to the inlet.

2. The baler of claim 1 wherein there are no structures of the baler between the drum roller and said one belt roller except for sections of said belts and the protective material disposed in the inlet.

3. A round baler for producing cylindrical bales of a certain length defined by the distance between the inside surfaces of two basically flat panels with a netwrap inlet area configured to accept netwrap material that is wider than the length, the inlet area comprising;

a) a front side defined by a drum roller with a length approximately equal to the length of the cylindrical bale configured for direct contact with the bale, having no belts between the drum roller and the bale;

b) a rear side defined by a belt roller with a length approximately equal to the length of the cylindrical bale configured for indirect contact with the bale, having belts between the drum roller and the bale;

c) first and second sides, spaced apart a distance equal to approximately the length of the cylindrical bale, defined by the flat panels; and d) arcuate wedge members operatively attached to the flat panels, said arcuate wedge members being concentric to the drum roller;

e) wherein the netwrap material contacts the formed bale in a void created by the wedges and in front of the belt roller.

4. A baler with a generally cylindrical bale forming chamber with ends defined by panels, a right side panel and a left side panel, and belts routed over rollers extending between the panels for supporting a forming bale such that a lower roller defines a bottom of the bale forming chamber and further including a netwrap mechanism to feed netwrap material to an inlet area located near the bottom of the bale forming chamber, the netwrap mechanism including a feed pan disposed under the belts said feed pan comprising: flexible net guides in a spaced relation to the lower roller that are supported underneath the flexible net guides by a closest cross-member to the lower roller, which closest lower cross member is spaced no closer than two (2) inches from the lower roller.

5. The baler of claim 4 wherein the closest cross-member is spaced no closer than ten (10) inches from the lower roller.

6. A baler with a generally cylindrical bale forming chamber with ends defined by panels, a right side panel and a left side panel, and belts routed over rollers extending between the panels for supporting a forming bale such that a lower roller defines a bottom of the bale forming chamber, and further including a netwrap mechanism to feed netwrap material to an inlet area located near the bottom, the lower roller having a diameter, the netwrap mechanism including a feed pan comprising;

f) flexible net guides, narrower than the bale forming belts, and having a thickness less than a width; and g) supporting cross members, providing support for the flexible net guides;

h) wherein no cross member is nearer to the lower roller than one lower roller diameter.

7. The baler of claim 6 wherein the thickness of the flexible net guides is at least one order of magnitude as thick as the width of the flexible net guides.

8. The baler of claim 6 wherein the cross members are substantially parallel to an axis of rotation of the bale, and are non-rotational.

9. A baler with a generally cylindrical bale forming chamber with ends defined by panels, a right side panel and a left side panel, and belts routed over rollers extending between the panels for supporting a forming bale such that a lower roller defines a bottom of the bale forming chamber and further including a netwrap mechanism to feed netwrap material to an inlet area located near the bottom of the bale forming chamber, the netwrap mechanism including a feed pan comprising: flexible net guides in a spaced relation to the lower roller that are supported by a cross-member spaced a minimum horizontal distance from the lower roller equal to the diameter of the lower roller.

10. An improvement to a baler with a generally cylindrical bale forming chamber with ends defined by panels, a right side panel and a left side panel, baler forming belts that are routed over rollers extending between the panels for supporting a forming bale and a pickup for directing crop material into contact with the bale forming belts where it is directed rearward away from the pickup and around the periphery of the forming bale until it eventually returns to the vicinity of the pickup, further including a netwrap assembly for feeding netwrap material into contact with the periphery of a formed bale, the improvement comprising a guide positioned generally above the pickup to direct crop material previously inserted into the bale formation chamber and to direct the netwrap material away from the pickup.

11. The improvement of claim 10 wherein the guide comprises a generally horizontal rigid plate.

12. The improvement of claim 11 wherein the guide comprises a plurality of narrow plates.

13. The improvement of claim 10 wherein the guide comprises a generally vertical flexible plate.

14. A round baler having a frame and flat bale forming belts for producing cylindrical bales, and a netwrap mechanism for feeding netwrap material from a supply roll comprising:

a) a net knife fixed with respect to the frame;

b) a roll of netwrap material disposed on a spindle operatively rotatably attached to the frame;

c) a brake for selectively applying a braking force to inhibit rotation of the roll of netwrap material;

b) a net pan operatively pivotally attached to the frame and moveable among a first pan position wherein the netwrap material is routed away from the knife and into contact with the bale forming belts, a second pan position wherein the netwrap material is directed away from the knife, and a third pan position where the netwrap material can contact the knife; and c) a driver, including a cross-member, an activator and net spreader roller, that can be moved among three places including a first place wherein the activator rotates the net pan into the first pan position to release a net brake to thereby release tension in the netwrap material; a second place wherein the activator rotates the net pan to its second position and applies the net brake; and a third place where the activator rotates the net pan into its third position, and the cross-member traps the netwrap material against the net knife.

15. A round baler for producing cylindrical bales of a certain length defined by a distance between inside surfaces of two basically flat panels with a netwrap inlet area configured to accept netwrap material that is wider than the length, said inlet area comprising;
 a) a front side defined by a drum roller with a length approximately equal to the length of the cylindrical bale configured for direct contact with the bale, that is, with no belts between the drum roller and the bale;
 b) a rear side defined by a belt roller with a length approximately equal to the length of the cylindrical bale configured for indirect contact with the bale, that is, with belts between the belt roller and the bale;
 c) first and second ends, spaced apart a distance approximately equal to the length of the cylindrical bale, defined by the flat panels and arcuate wedge members mounted to the flat panels and that are concentric to the drum roller; and
 d) wherein the arcuate wedge members extend from the front side to the rear side defining a top of the inlet area at the first and second ends.

16. An apparatus for cylindrical bales of crop material, said apparatus comprising:
 a crop pickup assembly for picking up the crop material and delivering said crop material into the baler;
 a drum roller disposed behind the crop pickup assembly;
 a belt roller, over which belts run, disposed behind the drum roller and spaced away from the drum roller;
 netwrap material disposed between the drum roller and the belt roller;
 at least one arcuate wedge member for forming a space at an outer edge of the cylindrical bale to allow the netwrap material to engage the cylindrical bale;
 an upper surface of the at least one arcuate wedge member formed as a circular arc shape, a center of said circular arc being toward a rear of the baler compared to an axis of rotation of the drum roller;
 a lower surface of the said at least one arcuate wedge member formed as a circular arc shape concentric with the drum roller; and
 a front edge of the at least one arcuate wedge member located behind a line of intersection of the upper surface and the lower surface.

* * * * *